Oct. 26, 1965    J. L. RODGERS ETAL    3,214,133
FLOW CONTROLLING DEVICE
Filed July 1, 1963

INVENTORS.
JAMES LINN RODGERS
ROBERT B. CAVES
BY

ATTORNEYS.

United States Patent Office 3,214,133
Patented Oct. 26, 1965

3,214,133
FLOW CONTROLLING DEVICE
James Linn Rodgers, 9606 La Serna Drive, Whittier, Calif., and Robert B. Caves, 10028 Deerhaven Drive, Santa Ana, Calif.
Filed July 1, 1963, Ser. No. 291,808
3 Claims. (Cl. 251—175)

This invention pertains to a device for controlling the flow of fluid, and in particular to a valving arrangement suitable for a lawn or garden sprinkler.

In accordance with the present invention a reliable and effective valve unit may be produced at an extremely low cost. The unit is adapted for construction from molded plastic parts so that the completed article is not subject to corrosion and does not tend to retain mineral deposits from the water passing through it. It is made up of a minimum number of components which are held together by only a single fastener. Despite this the unit is reliable, affording a positive shut-off seal and unrestricted full fluid flow when opened.

The invention includes a body adapted to transmit fluid, within which is pivotally mounted a member having an outer surface defining a segment of a sphere. This surface engages an annular sealing member of softer material and which has a smaller radius than that of the spherical segment. The sealing member includes a rounded annular bead for contact with the rotatable member, which prevents distortion of the seal and assures that leakage will not occur as a result of the movement of the pivotal member against it. The pivot shaft for the rotatable member extends through a clearance opening in the body, allowing the fluid forces present to urge the rotatable member into sealing engagement with the annular element. An O-ring on the shaft prevents leakage at that point.

It is an object of this invention to provide a low cost but durable and effective fluid control device.

Another object of this invention is to provide a fluid flow device adapted for construction from molded plastic parts.

A further object of this invention is to provide a fluid flow device assembled without substantial use of fasteners.

Yet another object of this invention is to provide a valve unit made up of very few parts.

An additional object of this invention is to provide an improved sprinkler for use with a garden hose.

Figure 1:
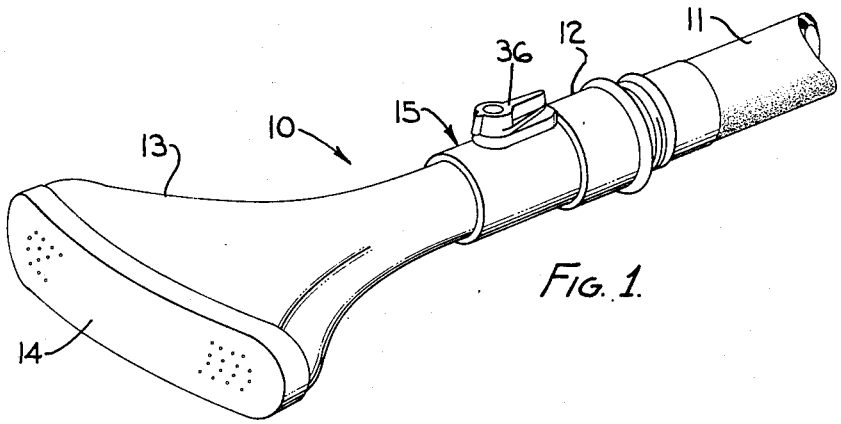
Figure 2:
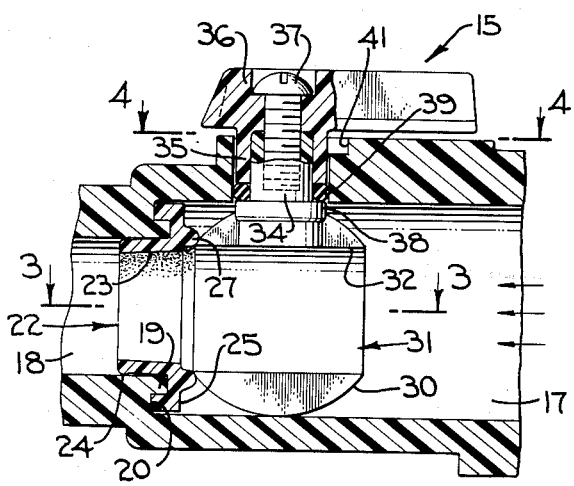
Figure 5:
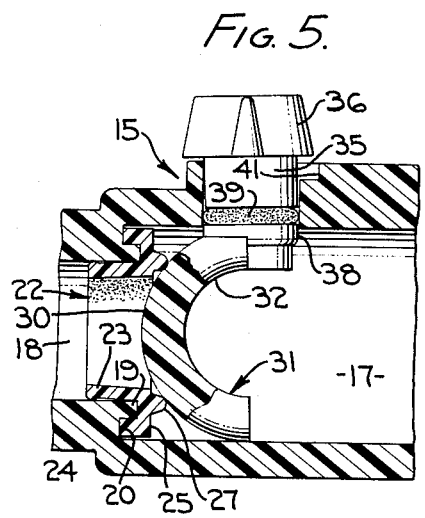
Figure 3:
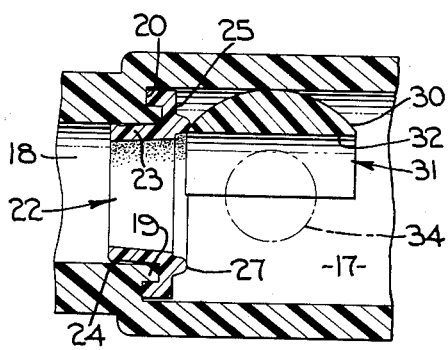
Figure 4:
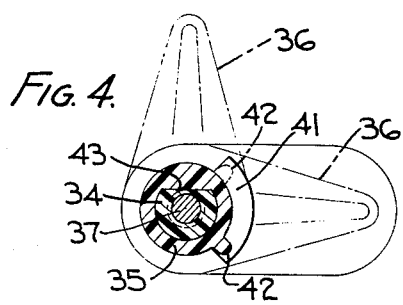

These and other objects will become apparent from the following detailed description taken in connection with the accompanying drawing in which:

FIGURE 1 is a perspective view of a sprinkler unit incorporating the device of this invention, FIGURE 2 is an enlarged fragmentary longitudinal sectional view of the valve portion of the unit of FIGURE 1, showing the valve member in the open position, FIGURE 3 is a fragmentary longitudinal sectional view taken along line 3—3 of FIGURE 2, FIGURE 4 is a further longitudinal sectional view taken along line 4—4 of FIGURE 2, and FIGURE 5 is a sectional view similar to FIGURE 2 but with the valve in the closed position.

With reference to the drawing, the invention is shown incorporated in a lawn or garden sprinkler 10 attached to an ordinary garden hose 11. The sprinkler 10 includes an internally threaded end portion 12 that receives the exteriorly threaded fitting of the hose 11. The sprinkler is hollow, including a laterally divergent diffuser portion 13 terminating in a perforated end wall 14. Thus, water from the hose 11 enters the sprinkler 10, passing into the divergent section 13 to be discharged from the multiplicity of small holes formed in the end wall 14. This produces a wide evenly dispersed low velocity spray suitable for watering a lawn or garden. The flow of fluid through the unit is controlled by a valve portion 15 incorporated into the sprinkler 10.

The valve unit 15 includes a first cylindrical chamber 17 at the upstream side of the unit that communicates with a second and smaller cylindrical chamber 18 through which the fluid discharges. This defines a shoulder between the two chambers which is of stepped configuration to include an inner axially projecting flange portion 19 connecting to recessed outer portion 20. On this dividing shoulder is mounted an annular sealing member 22. While the valve body normally is made of a relatively hard plastic, such as polystyrene or any other suitable material, sealing member 22 is of a much softer material. A soft polyvinyl chloride is particularly suitable for the member 22. The seal performs quite satisfactorily when it falls within the range of from around 70 to 90 Shore hardness.

The element 22 includes a short cylindrical section 23 which extends into the chamber 18 beyond the flange portion 19. The section 23 is provided with an annular bead 24 projecting outwardly from the end and engaging the inner wall of the chamber 18 in a firm contacting relationship. The opposite end 25 of the member 22 extends radially outward and is appropriately recessed to receive the projecting flange 19 of the valve body extending also into the recessed section 20. The sealing member 22 is dimensioned so that it fits closely on the flange 19 where it is held by a friction fit.

On the upstream side of the sealing member 22 there is formed an annular bead 27. This portion of member 22 not only is circular in elevation, but also is arcuate in cross section, presenting a convexly curved half-round outer surface. It is on this surface that the valve seal is effected for controlling the flow of fluid through the unit 10. The outer surface of the bead 27 of member 22 is engaged by convex surface 30 of a rotatable valve member 31. The surface 30 is defined by a segment of a sphere having a radius of curvature substantially equal to the radius of chamber 17, and greater than that defining the annular bead 27. The bottom of the valve member engages the bottom of chamber 17. Interiorly the member 31 is recessed to define a semicylindrical aperture 32. This opening is coaxial with the annular bead 27, and its axis intersects the center point of spherical section 30.

A stem 33 extends upwardly from the member 31 into radial opening 34 in the valve body. The distal end of the stem fits within a complementary recess in a depending cylindrical portion 35 of handle 36. The stem is secured to handle 36 by a screw 37 that enters an opening in the end of the stem 34. The depending cylindrical portion 35 of the handle 36 defines a shaft about which the member 31 rotates. The axis of rotation thus produced is perpendicular to the axis of the annular bead 27 and intersects the center point of the spherical surface 30.

The cylindrical section 35 of the handle fits loosely within the opening 34 in the valve body and stops short of annular flange 38 at the base of the stem 34. Between this flange and the end of depending section 35 of the handle is retained an O-ring 39 that seals the stem with respect to the valve body.

An arcuate recess 41 is formed in the exterior of the valve body to receive tab 42 projecting radially outward from the cylindrical section 37 of the handle 35. This tab acts as a stop to limit the rotational movement which can be given the member 31. The recess 41 extends through an arc of ninety degrees so that the member 31 can be pivoted a like amount. As indicated in FIGURE 4, the tab 42 will engage either end of the slot 41 to limit the rotation that takes place. The handle and stem 34 are coupled together in a predetermined relationship as determined by the interengaging flat areas 43. As a consequence, when the unit is assembled the member 31 may assume either the full open position shown in FIGURES 2 and 3, or at the other extreme the closed position of FIGURE 5. To open the valve the user simply moves the handle 36 to pivot the handle so that it is aligned with a longitudinal dimension of the valve body, and the valve is closed by rotating the handle 36 to a position where it is at right angles to the axis of the valve body.

The semicylindrical recess 32 in the member 31 assures that there is a full fluid passageway through the unit when the valve is open. The radius of the section 32 is slightly greater than the radius of the interior of the cylindrical portion 23 of the sealing member 22, so that it offers only an inconsequential restriction as the water flows through the valve.

Upon rotation of the member 31 to the closed position, the spherical outer surface 30 rides along the bead 28, maintaining a fluidtight engagement with this surface as the movement takes place. The pressure on the upstream side of the member 31 urges this element in a downstream direction so that the outer surface 30 is held in firm sealing contact with the periphery 28 of the annular bead 27. This type of contact is assured by the fact that the valve stem is in a clearance opening through the valve body. Therefore, the clearance at the valve stem allows the fluid pressure in the valve to react against the inner surface 32 and force the outer spherical surface against bead 27. The use of a flexible O-ring to seal the valve stem makes this movement possible while preventing leakage at the location of the valve stem. This valve, therefore, receives a beneficial effect from the water pressure in chamber 17, which serves to hold the rotatable member firmly against the seal and preclude leakage.

The performance of the valve unit of this invention is enhanced considerably by virtue of the arcuate half-round outer surface of the sealing bead 27. Upon rotation of the member 31 from the open toward the closed position, the friction generated between the bead 27 and the exterior surface 30 of the valve member tends to drag the bead inwardly in the direction of movement on the side of the bead contacted by the valve member. It also tends to push the opposite side of the bead outwardly when it contacts that side of the bead as the valve approaches its closed position. If the bead were in the form of a thin flange or other such configuration, it would become distorted from this frictional force being folded over so that it would be impossible to obtain a seal with the valve closed. Any sharp edge at the periphery of the seal will tend to catch at least occasionally on the valve surface 30 so that such a construction will lack reliability. However, the arcuate nature of the bead surface 28 provides an adequate strength to resist the friction of the valve member. It also gives the bead an outwardly curved surface beyond where the spherical surface 30 enters the sealing member. Consequently the bead is rounded and also drops away from the line of contact, while at the same time having considerable strength and resistance to bending. With this relationship the bead remains undistorted and a perfect seal is secured.

Moreover, the seal is preserved despite wear of the bead 27 with long use of the valve. The water pressure always urges the spherical surface 30 into the seal to result in fluidtight contact. There is no rigid element present in association with the seal, so that always there is engagement between the valve and seal. Thus, the elimination of a rigid backing for the seal gives a further advantage to the design of this invention.

From the foregoing it can be seen that we have provided a simplified valve unit particularly adapted for sprinkler devices or the like. It can be manufactured from a very few molded plastic parts that are readily assembed together and held by only a single screw. Nevertheless, the action of the valve is effective and the unit is rugged and durable. The chemical inertness of the plastic valve components offers further advantages over conventional designs in which metallic parts are utilized.

The foregoing detailed description is to be clearly understood as given by way of illustration and example only, the spirit and scope of this invention being limited solely by the appended claims.

We claim:
1. A flow controlling and transmitting device comprising
 a first cylindrical chamber adapted to be connected on the upstream side of a fluid conduit,
 a second cylindrical chamber communicating with said first chamber and adapted for connection to the downstream side of a fluid conduit,
 an annular flange at the juncture between said chambers,
  said flange being cylindrical in shape and of smaller diameter than said first chamber,
   thereby to define a recess outwardly thereof,
 a sealing member,
  said sealing member including a first annular portion in said recess,
  a second portion overlying the upstream side of said flange,
  and a third portion radially inwardly of said flange,
   whereby said flange retains said sealing member,
  said second portion of said sealing member having an annular bead,
   said annular bead presenting a rounded convex surface on the upstream side thereof,
 a valve member in said first chamber,
  said valve member having a surface defined by a spherical segment,
   said surface being in engagement with said bead,
  said valve member having a stem extending outwardly from said surface,
  said chamber having a wall having an aperture through which said stem passes,
   said stem being smaller in transverse dimension than the transverse dimension of said aperture,
    whereby said valve member has freedom for limited floating movement with respect to said sealing member,
 and an additional sealing means for precluding leakage from said chamber around said stem.

2. A device as recited in claim 1 in which
 said aperture and said stem are cylindrical,
  said stem having an annular groove therein,
  said additional sealing means comprising an O-ring in said annular groove,
   said O-ring having a greater diameter than the diameter of said stem,
  the periphery of said O-ring being in engagement with said wall at said aperture for effecting a seal while permitting said limited floating movement.

3. A flow controlling device for use with a water sprinkler comprising
 a body
  defining a first cylindrical chamber at the upstream side thereof
  and a second cylindrical chamber at the downstream side thereof,
   said chambers being in open communication,
  said first chamber being of greater diameter than said second chamber,
 a cylindrical flange at the juncture of said chambers,
  said flange extending into said first chamber and being of smaller diameter than the diameter of said first chamber,
thereby defining an annular recess outwardly thereof,
a sealing member,
said sealing member including a cylindrical portion radially inwardly of said flange
and extending axially into said second chamber,
said sealing member having a radial portion over the forward portion of said flange,
an outer portion outwardly of said flange and extending into said recess,
whereby said flange retains said sealing member,
said sealing member having an annular bead forwardly of said radial portion,
said annular bead presenting a rounded convex outer surface,
a valve member,
said valve member having a semispherical outer surface engaging said annular bead,
said outer surface having a radius of curvature substantially equal to the radius of curvature of said first chamber,
said valve member having a semicylindrical surface inwardly of said outer surface,
said valve member having a stem,
said body having a radial opening therethrough,
said stem extending through said opening,
said opening being of greater diameter than the diameter of said stem,
whereby said valve member has freedom for limited floating movement with respect to said body,
and a seal in said radial opening engaging said stem and said body
for precluding leakage around said stem.

References Cited by the Examiner
UNITED STATES PATENTS

| | | | |
|---|---|---|---|
| 697,284 | 4/02 | Skiffington | 251—359 |
| 1,784,381 | 12/30 | O'Stroske | 251—359 |
| 2,665,879 | 1/54 | Housekeeper et al. | 251—163 |
| 2,709,112 | 5/55 | Curtice | 239—557 |
| 2,768,643 | 10/56 | Acomb | 251—368 X |
| 2,803,426 | 8/57 | Zurik | 251—309 X |
| 2,813,529 | 11/57 | Ikse | 239—562 X |
| 2,820,605 | 1/58 | Doughtery | 251—307 |
| 2,820,675 | 1/58 | Zilk | 239—562 X |
| 2,865,596 | 12/58 | Monnig | 251—175 |
| 2,905,197 | 9/59 | Jones | 251—368 X |
| 2,914,258 | 11/59 | Reutsch | 239—562 |
| 3,064,940 | 11/62 | Anderson et al. | 251—249.5 |
| 3,093,358 | 6/63 | Wakeman | 251—314 |
| 3,111,136 | 11/63 | Persidsky | 251—304 X |

FOREIGN PATENTS

| | | |
|---|---|---|
| 240,115 | 8/62 | Australia. |
| 988,840 | 5/51 | France. |
| 201,379 | 2/39 | Switzerland. |

M. CARY NELSON, *Primary Examiner.*

LAVERNE D. GEIGER, *Examiner.*